United States Patent
Chung (10) Patent No.: US 12,481,315 B2
(45) Date of Patent: Nov. 25, 2025

(54) ACCESSORY HANGERS

(71) Applicant: Hewlett-Packard Development Company, L.P., Spring, TX (US)

(72) Inventor: Tien Liang Chung, Taipei (TW)

(73) Assignee: Hewlett-Packard Development Company, Spring, TX (US)

( * ) Notice: Subject to any disclaimer, the term of this patent is extended or adjusted under 35 U.S.C. 154(b) by 344 days.

(21) Appl. No.: 18/250,969

(22) PCT Filed: Oct. 29, 2020

(86) PCT No.: PCT/US2020/057895
§ 371 (c)(1),
(2) Date: Apr. 27, 2023

(87) PCT Pub. No.: WO2022/093226
PCT Pub. Date: May 5, 2022

(65) Prior Publication Data
US 2023/0409076 A1    Dec. 21, 2023

(51) Int. Cl.
*G06F 1/16*    (2006.01)
(52) U.S. Cl.
CPC ................... *G06F 1/1607* (2013.01)
(58) Field of Classification Search
CPC ...... G06F 1/1607; G06F 1/166; G06F 1/1654; F16M 13/02
See application file for complete search history.

(56) References Cited

U.S. PATENT DOCUMENTS

| 5,094,417 | A |  | 3/1992 | Creed | |
|---|---|---|---|---|---|
| D327,501 | S | * | 6/1992 | Maloney | D19/86 |
| 5,619,395 | A | * | 4/1997 | McBride | G06F 1/1632 248/692 |
| 5,881,986 | A | * | 3/1999 | Hegarty | A47B 23/02 248/442.2 |
| 5,906,348 | A | * | 5/1999 | Orenstein | G06F 1/1607 248/311.2 |
| 6,100,942 | A | * | 8/2000 | Hollenbaugh | G06F 1/1607 248/220.22 |
| 6,550,737 | B1 | * | 4/2003 | Sai | F16M 13/02 211/69.1 |
| 6,845,954 | B1 | * | 1/2005 | Moayer | G06F 1/1607 396/428 |
| 6,903,926 | B2 | * | 6/2005 | Masuda | G06F 1/1607 361/679.05 |
| 6,970,202 | B1 | * | 11/2005 | Glogan | F16M 13/02 348/207.1 |

(Continued)

FOREIGN PATENT DOCUMENTS

| CN | 201839409 U | 5/2011 |
|---|---|---|
| CN | 203840399 U | 9/2014 |

(Continued)

*Primary Examiner* — Nidhi Thaker
(74) *Attorney, Agent, or Firm* — Quarles & Brady LLP (57) ABSTRACT

In an example, an accessory hanger may include a pivot to rotatably engage with a housing of an electronic device about a pivot axis and a hanger rotatably attached to the pivot about a hanger axis, transverse to the pivot axis. The pivot may rotate the hanger relative to the housing about the pivot axis between a stowed position and a deployed position and the hanger may be movable from an unlocked position to a locked position when in the deployed position.

20 Claims, 6 Drawing Sheets

(56) References Cited

U.S. PATENT DOCUMENTS

| | | | |
|---|---|---|---|
| 8,371,546 B2 | 2/2013 | Bauerly | |
| 8,960,618 B2 | 2/2015 | Chen | |
| 9,176,537 B2 | 11/2015 | Sharma et al. | |
| 9,195,265 B1* | 11/2015 | Jackson | G06F 1/1611 |
| 9,441,782 B2* | 9/2016 | Funk | F16M 13/00 |
| 10,027,946 B2* | 7/2018 | Ent | H04N 13/207 |
| 10,356,288 B2* | 7/2019 | Lin | F16M 11/2085 |
| 2007/0001071 A1* | 1/2007 | Yeh | F16M 11/14 |
| | | | 248/179.1 |
| 2008/0103637 A1* | 5/2008 | Bliven | F16B 2/20 |
| | | | 701/1 |
| 2008/0123314 A1* | 5/2008 | Cheng | G06F 1/1616 |
| | | | 361/809 |
| 2009/0095871 A1* | 4/2009 | Xiao | G06F 1/1607 |
| | | | 248/442.2 |
| 2010/0053409 A1* | 3/2010 | Chang | G06F 1/1686 |
| | | | 348/E5.022 |
| 2010/0080543 A1* | 4/2010 | Yu | G03B 15/00 |
| | | | 396/5 |
| 2011/0050910 A1* | 3/2011 | Fan | H04N 23/51 |
| | | | 348/207.1 |
| 2011/0222231 A1* | 9/2011 | Huang | G06F 1/187 |
| | | | 361/679.21 |
| 2014/0061406 A1 | 3/2014 | Chevalier et al. | |
| 2016/0045831 A1* | 2/2016 | Kliot | A63F 13/837 |
| | | | 463/5 |
| 2016/0234955 A1* | 8/2016 | Wengreen | H04N 5/64 |
| 2023/0136884 A1* | 5/2023 | Li | G06F 1/1607 |
| | | | 248/316.7 |
| 2023/0152843 A1* | 5/2023 | Chung | G06F 1/1607 |
| | | | 361/679.22 |

FOREIGN PATENT DOCUMENTS

| | | |
|---|---|---|
| CN | 203909668 U | 10/2014 |
| CN | 204087053 U | 1/2015 |

* cited by examiner

ACCESSORY HANGERS

BACKGROUND

Electronic devices such as computing devices provide various ways for a user to engage with the electronic device. For instance, an electronic device may be able to provide for user input through a keyboard, mouse, touch-screen display, touch-input stylus, etc. Additionally, an electronic device may provide various types of output to a user, for example, visual output through a display and audio output through an audio jack, speakers, or the like. As such, users may employ device accessories such as audio headsets, touch-input styluses, etc. to interact with an electronic device.

DETAILED DESCRIPTION

As described above, users may engage and interact with electronic devices by employing the use of device accessories. Such device accessories may include input accessories such as peripheral control pads, mice, keyboards, and/or styluses for use with touch-screen displays. Device accessories may also include output accessories such as audio devices like speakers, subwoofers, and/or headsets. For device accessories that are relatively small and/or portable, it may be desirable to stow such devices away so as to not lose track of them when they are not being used.

As such, users may opt to store such device accessories in a bag, backpack, drawer, on a desktop etc. when not in use. This may still allow the user to lose track of where such devices have been stowed. Further, it may take longer than desirable to locate such device accessories when the user may wish to utilize them with the electronic device. In some situations, a user may employ a standalone or stick-on hook or tab on a wall, cubicle portion, or even the electronic device itself in order to provide a simple and easy-to-find storage solution for device accessories. Often, these standalone hooks, tabs, etc. may be unreliable, or may have a negative aesthetic appearance, especially when attached to the electronic device and/or when the hooks are not in use.

Thus, in some situations, it may be desirable to provide an easy-to-use and simple storage or stowage solution for small and/or portable device accessories that may allow quick stowage and retrieval of such device accessories, while also providing a positive or clean aesthetic appearance when the stowage solution is not in use.

Implementations of the present disclosure provide accessory hangers for electronic devices that are movable between stowed and deployed positions so as to provide a clean and desirable aesthetic when such hangers are not being used. When it is desired to stow device accessories on the accessory hangers, such hangers are easily accessible. Further, device accessories are easily retrievable from such hangers so as to provide a positive user experience.

Figure 1A:
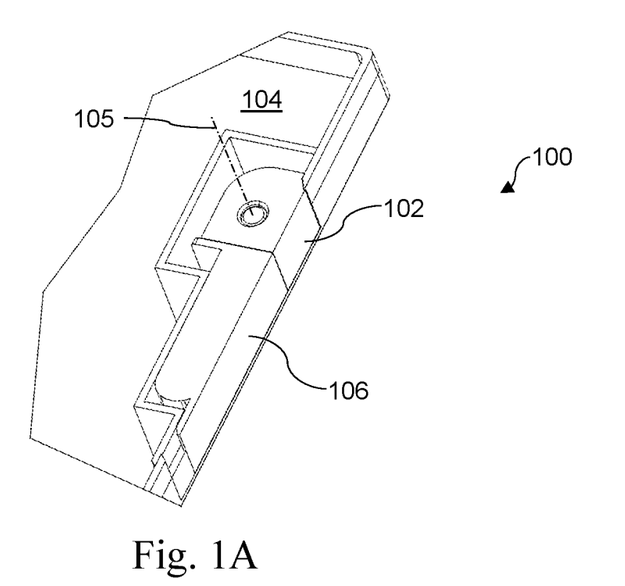
FIG. 1A is a perspective view of an example accessory hanger.

Referring now to FIG. 1A, a perspective view of an example accessory hanger 100 is illustrated. Accessory hanger 100 may include a pivot 102 to rotatably engage with a housing 104 of an electronic device about a pivot axis 105. The accessory hanger 100 may further include a hanger 106 rotatably attached to the pivot 102. The pivot 102 may rotate the hanger 106 relative to the housing 104 about the pivot axis 105 between a stowed position, illustrated in FIG. 1A, and a deployed position, illustrated in FIGS. 1B-1C. The hanger 106 may be a rigid or semi-rigid elongate member capable of supporting the weight of a device accessory placed on top of the hanger 106 in a cantilevered fashion when the hanger 106 is in the deployed position.

Figure 1B:
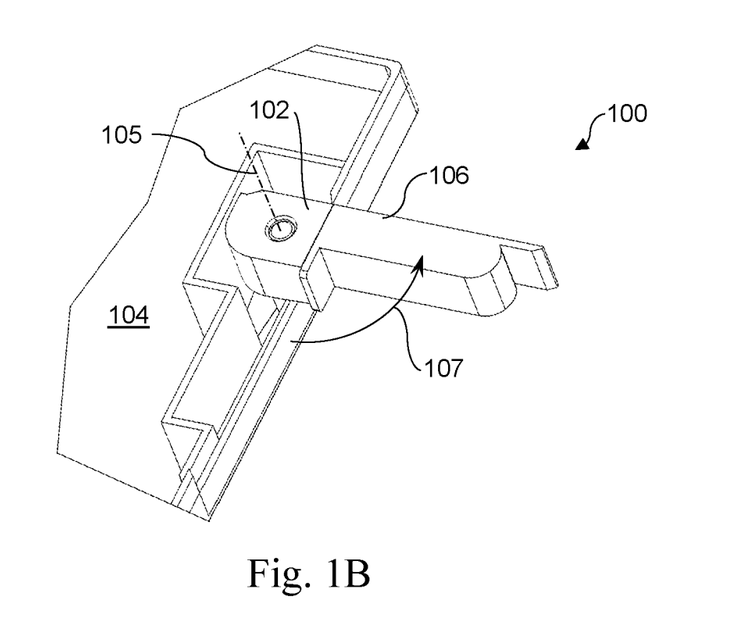
FIG. 1B is another perspective view of the example accessory hanger of FIG. 1A.

Referring additionally to FIG. 1B, another perspective view of accessory hanger 100 is illustrated wherein the hanger 106 is disposed in the deployed position. For example, the pivot 102 and the hanger 106 have transitioned from the stowed position to the deployed position along direction 107, about the pivot axis 105.

Figure 1C:
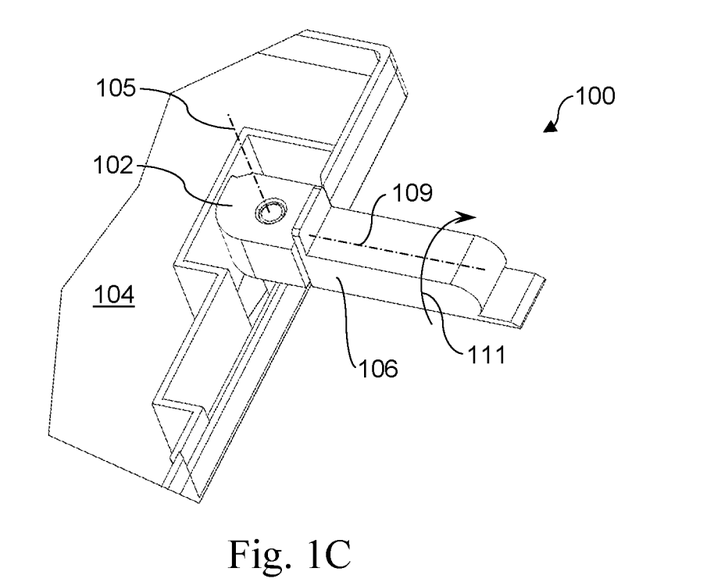
FIG. 1C is another perspective view of the example accessory hanger of FIGS. 1A-1B.

Referring additionally to FIG. 1C, another perspective view of accessory hanger 100 is illustrated. Hanger 106 may be rotatably attached to the pivot 102 about a hanger axis 109. In some examples, hanger axis 109 may be transverse to pivot axis 105. In this context, transverse may refer to a direction of the hanger axis 109 not being parallel to the direction of the pivot axis 105. In further examples, hanger axis 109 may be orthogonal or perpendicular to the pivot axis. In yet further examples, hanger axis 109 may extend longitudinally along a length of the hanger 106.

The rotatable nature of the attachment of the hanger 106 to pivot 102 about the hanger axis 109 may enable the hanger 106 to rotate relative to the pivot 102. Additionally, the hanger 106 may be sufficiently attached to the pivot 102 so as to be able to rotate with the pivot 102 about the pivot axis 105 relative to the housing 104. Thus, the hanger 106 is able to rotate in two different dimensions or axes relative to the housing 104.

Once the hanger 106 is disposed in the deployed position, the hanger 106 may be able to rotate about the hanger axis 109, relative to the pivot 102, from an unlocked position, illustrated in FIG. 1B, to a locked position, illustrated in FIG. 1C, for example along direction 111.

Figure 2A:
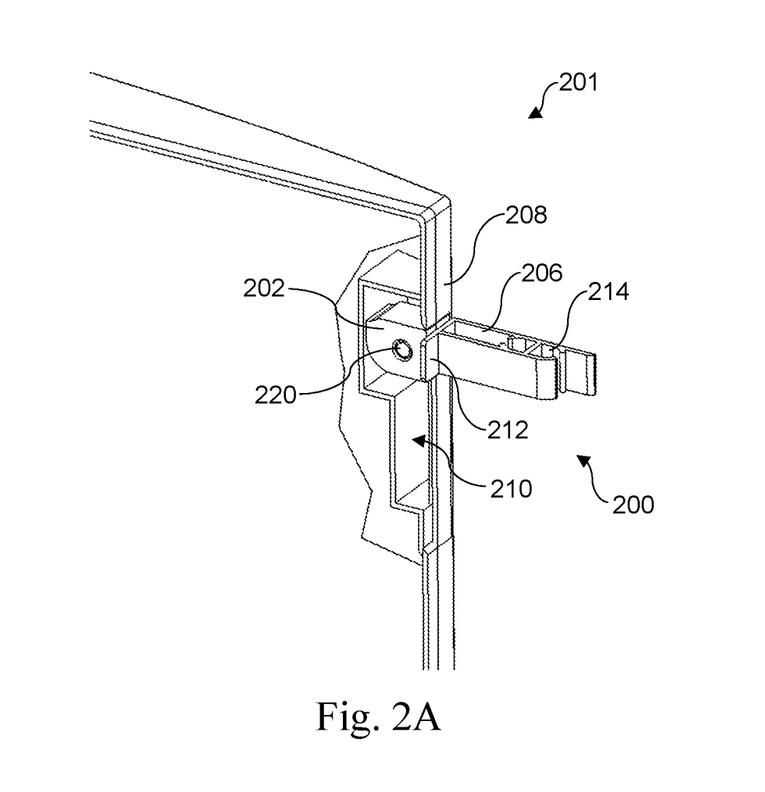
FIG. 2A is a partial perspective cutaway view of an example housing of an electronic device having another example accessory hanger.

Referring now to FIG. 2A, a partial perspective cutaway view of an example housing 201 for an electronic device having another example accessory hanger 200 is illustrated. Example accessory hanger 200 may be similar to other example accessory hangers described above. Further, the similarly-named elements of example accessory hanger 200 may be similar in function and/or structure to the respective elements of other example accessory hangers, as they are described above.

Housing 201 may be a support or protective structure for an electronic device and may include a frame, enclosure, exterior panels, etc. Such structures may enable the housing 201 to mechanically support and protect components of the electronic device disposed within the housing 201. In some examples, the housing 201 may include an exterior panel 208 and a hanger opening 210 in or extending into or through the exterior panel 208 to an interior volume, or a portion thereof, of the housing 201.

Housing 201 may further include the accessory hanger 200 disposed or movably or pivotably disposed within the hanger opening 210. The accessory hanger 200 may include a hanger 206 rotatably attached to a pivot 202. The pivot 202 may move the hanger 206 between a stowed position, disposed within the hanger opening 210, and a deployed position, extending from the hanger opening 210 (illustrated in FIG. 2A), about a pivot axis. The pivot 202, in some examples, may stay disposed within the housing 201 or hanger opening 210 therein, both in the stowed position and the deployed position. When in the deployed position, the hanger 206 may extend from the hanger opening 210, or the exterior panel 208, in a transverse or lateral fashion. In some examples, the hanger 206 may extend in an orthogonal or perpendicular direction from a plane of the exterior panel 208. In further examples, the hanger 206 may extend from the housing 201 in a cantilevered fashion.

Figure 2B:
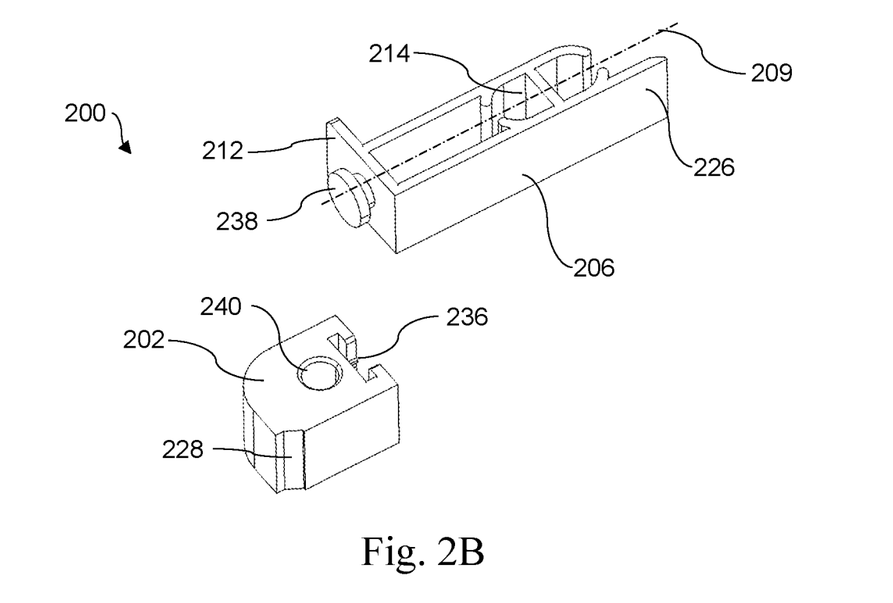
FIG. 2B is an exploded perspective view of the example accessory hanger of FIG. 2A.

Referring additionally to FIG. 2B, an exploded perspective view of the accessory hanger 200 is illustrated. The hanger 206 may be rotatably engaged or attached to the pivot 202. In some examples, the pivot 202 may include a slot or opening to receive a post or protrusion of the hanger 206 to enable a rotatable engagement between the two. In further examples, the pivot 202 may include a t-slot 236 to receive a flange post 238 of the hanger 206 centered on a hanger axis 209 extending along a length of the hanger 206 such that the hanger 206 is rotatable relative to the pivot 202 about the hanger axis 209 and also captured or retained in engagement with the pivot 202.

Figure 2C:
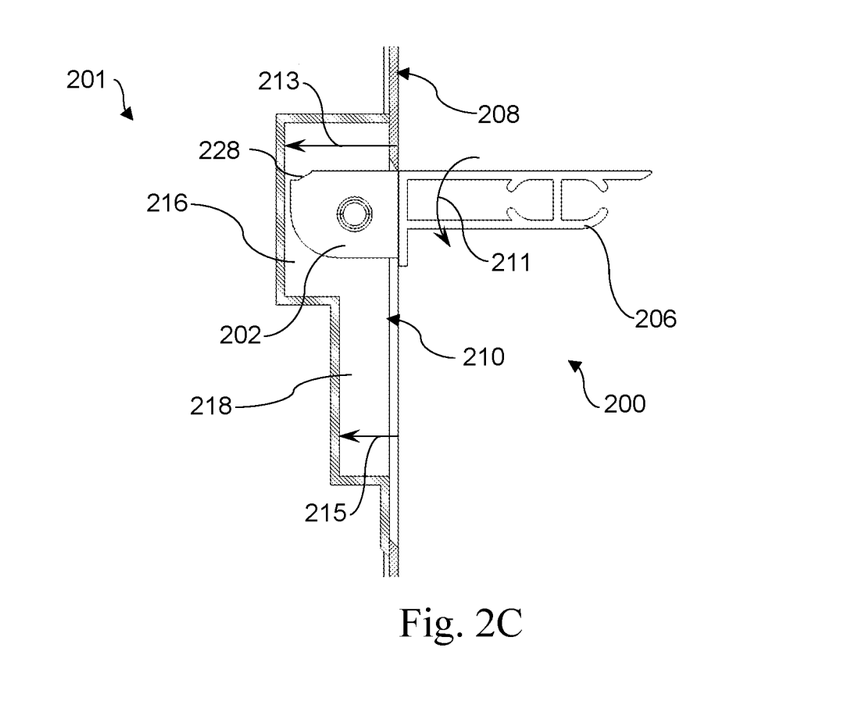
FIGS. 2C-2D are a cutaway front views of the example housing and accessory hanger of FIGS. 2A-2B.

Referring additionally to FIG. 2C, a cutaway front view of the example housing 201 is illustrated. The hanger 206 is rotatable between a locked position, illustrated in FIG. 2A, and an unlocked position, illustrated in FIG. 2C, relative to the pivot 202 about the hanger axis 209 when the hanger 206 is disposed in the deployed position. The hanger 206 may include a lock tab 212 extending from the hanger 206 to prevent the hanger 206 from moving from the deployed position to the stowed position while the hanger 206 is in the locked position. When in the locked position, as illustrated in FIG. 2A, the lock tab 212 may be disposed adjacent to, pressing against, or interfering with, the exterior panel 208 in order to prevent movement of the hanger 206 about the pivot axis. Stated differently, upon the hanger 206 being moved about the pivot axis from the stowed position to the deployed position, the hanger 206 may be rotated to the locked position such that the lock tab 212 is to prevent the hanger 206 from moving back to the stowed position. Thus, the hanger 206 is locked in the deployed position and is able to receive and support the weight of a device accessory or accessories placed thereupon. In some examples, hanger 206 may also include a utensil slot 214 extending through a thickness of the hanger 206. When the hanger 206 is in the deployed and locked position, the utensil slot 214 may be oriented in a substantially vertical orientation, or in another suitable orientation so as to securely receive and retain a utensil accessory within the utensil slot 214 for stowage. Such utensil slot 214 may have protrusions, tabs, ribs, teeth, or other suitable structure so as to securely retain a utensil accessory within. In some examples, the hanger 206 may include multiple utensil slots 214 so as to be able to stow multiple utensil accessories.

In order to move the hanger 206 to the stowed position, the hanger 206 is first rotated about the hanger axis 209 relative to the pivot 202 and housing 201 to transition from the locked position to the unlocked position, e.g., along direction 211, as illustrated in FIG. 2C. Accordingly, the lock tab 212 is no longer interfering with or pressed against an external surface of the exterior panel and the hanger 206 is free to be moved about the pivot axis toward the hanger opening 210.

Figure 2D:
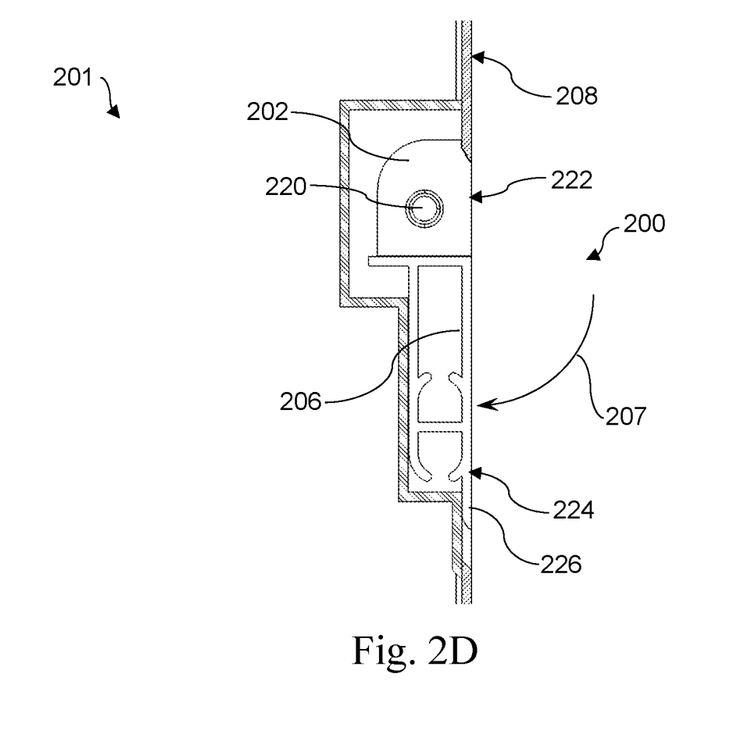

Referring additionally to FIG. 2D, another cutaway front view of the example housing 201 is illustrated wherein the hanger 206 has been transitioned from the deployed position to the stowed position, e.g., along direction 207. The hanger 206 is now disposed within the hanger opening 210.

The hanger opening 210 may include a first portion 216 extending a first distance 213 into the exterior panel 208 and a second portion 218, adjacent the first portion 216, extending a second distance 215, less than the first distance 213, into the exterior panel 208. In some examples, the first portion 216 is to house the pivot 202 and the second portion 218 is to receive and house the hanger 206 when the hanger is disposed in the stowed position, as illustrated in FIG. 2D. Accordingly, the first portion 216 and the second portion 218 may have similar or corresponding volumes, profiles, and/or shapes to the respective pivot 202 and hanger 206 so as to be able to receive and house the respective pivot 202 and hanger 206. In some examples, the first portion 216 may be sized and structured sufficiently so as to be able to house and/or enclose the pivot 202 when the hanger 206 is in both the stowed and deployed positions. Thus, the pivot 202 may be an internal component that does not extend out of the housing 201. In some examples, the second portion 218 may be sized similarly to that of the hanger 206 such that the hanger 206 is unable to rotate about the hanger axis 209 while in the stowed position due to interference with internal surfaces of the second portion 218. This may ensure that the hanger 206 is always in the correct or expected orientation to provide consistent user experience when deploying the hanger 206.

Referring together to FIGS. 2B and 2D, the housing 201 may further include a pivot post 220 disposed within the first portion 216 of the hanger opening 210 to rotatably engage with a channel 240 extending into or through the pivot 202. The channel 240 may define the pivot axis such that, when the pivot 202 is engaged with the pivot post 220, the pivot 202, and thus the hanger 206, is able to rotate about the pivot post 220, and thus the pivot axis, into and out of the hanger opening 210 of the housing 201 between the stowed and deployed positions.

Further, in some examples, the pivot 202 may also include a stop notch 228 on a side or edge of the pivot 202 to engage with the housing 201, or a portion thereof, when the hanger 206 is in the stowed position so as to stop the pivot 202 from further rotating about the pivot axis. In other words, the stop notch 228 may press against or interfere with a portion of the housing 201 once the hanger 206 has completely transitioned to the stowed position within the hanger opening 210 so as to stop further movement or rotation into the hanger opening 210. Accordingly, each of the pivot 202 and hanger 206 may have an exterior surface 222 and 224, respectively, that may lay or be flush with an external surface of the exterior panel 208 when the hanger 206 is disposed in the stowed position. In this way, when the accessory hanger 200 is stowed within the housing 201 and not in use, the accessory hanger 200 can provide a smooth, clean, and aesthetically-pleasing appearance to a user.

In further examples, the hanger 206 may include an actuation tab 226 at a distal end of a length of the hanger 206. Such actuation tab 226 may assist a user in actuating or transitioning the hanger 206 between the stowed and deployed positions. The actuation tab 226 may be a projection or protrusion extending from the distal end of the hanger 206 and may be spaced apart from the exterior panel 208, or a portion thereof, when the hanger 206 is in the stowed position. As such, a user may be able to access the actuation tab 226, or an edge thereof in order to provide leverage to the hanger 206 to pull the hanger 206 out of the hanger opening 210 and to the deployed position.

Figure 3A:
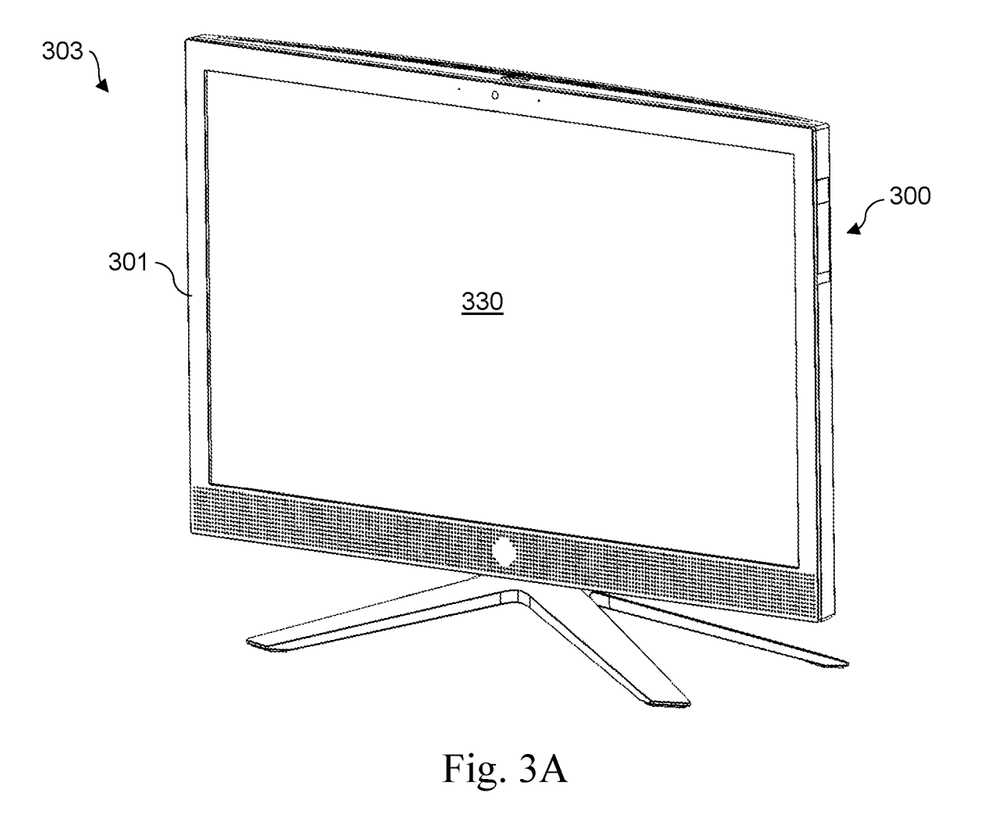
FIG. 3A is a perspective view of an example electronic device having an example accessory hanger.

Referring now to FIG. 3A, a perspective view of an example electronic device 303 having an example accessory hanger 300 is illustrated. Example accessory hanger 300 may be similar to other example accessory hangers described above. Further, the similarly-named elements of example accessory hanger 300 may be similar in function and/or structure to the respective elements of other example accessory hangers, as they are described above.

Electronic device 303 may be a computing device, in some examples, such as a desktop personal computer (PC), a notebook PC, an all-in-one (AIO) computing device, and the like. In some examples, electronic device 303 may be a peripheral device for use with a computing device such as a peripheral display or monitor. In yet other examples, electronic device 303 may be another type of device, e.g., an imaging device such as a printer or copier, or an additive manufacturing machine such as a three-dimensional (3D) printer. In other examples, electronic device 303 may be any type of electronic device that may benefit from employing the use of accessories and the quick and easy stowage and retrieval thereof.

Electronic device 303 may include a housing 301. Housing 301 may be similar to housing 201, in some examples, and may include an exterior panel or a plurality thereof. The electronic device 303 may include a display 330 disposed in the housing 301 for providing visual output to a user such as text, video, a graphical user interface (GUI) and the like.

The accessory hanger 300 may be disposed within a hanger opening in an exterior panel. In some examples, the accessory hanger 300 and the hanger opening may be disposed on a side exterior panel of the housing 301, adjacent or to the side of the display 330. In this way, the accessory hanger 300, and/or accessories stowed thereon, can be easily accessible to a user facing the display 330. In other examples, the accessory hanger 300 and hanger opening may be disposed on another exterior panel, e.g., a back panel of the electronic device 303.

Figure 3B:
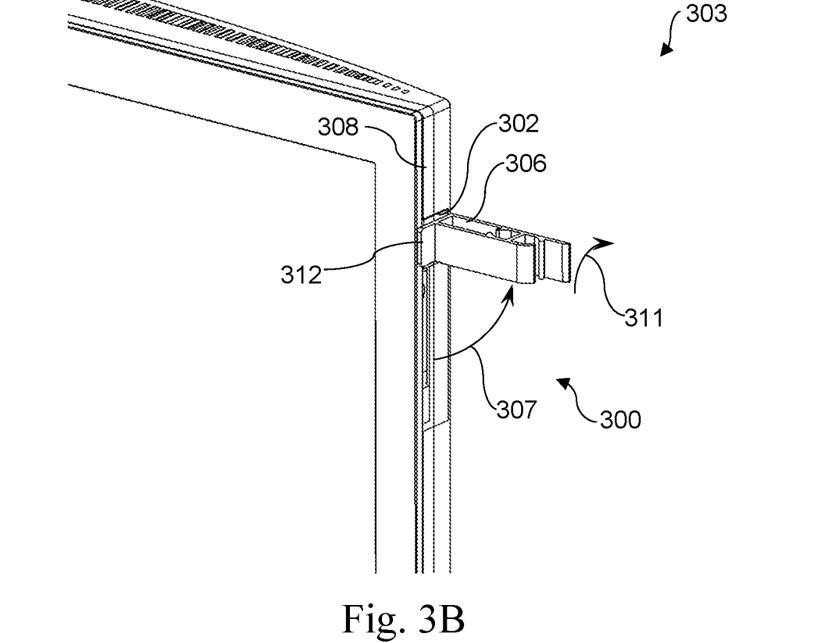
FIGS. 3B-3C are detail perspective views of the example electronic device and accessory hanger of FIG. 3A.

Referring now to FIG. 3B, a detail perspective view of the example electronic device 303 and the example accessory hanger 300 is illustrated, wherein a hanger 306 of the accessory hanger 300 has been transitioned from a stowed position, disposed within the hanger opening, to a deployed position, extending laterally or transversely from the housing 301, or the side exterior panel 308 thereof. The hanger 306 has moved by way of attachment to a pivot 302 that is rotatably about a pivot axis disposed substantially normal or orthogonal to a plane of view of the display 330. The hanger 306 has been moved, for example, along direction 307, aligned with the plane of view of display 330, to transition to the deployed position. Once in the deployed position, the hanger 306 has been moved along direction 311 to transition from an unlocked position to a locked position, wherein a lock tab 312 interferes with a portion of the side exterior panel 308 in order to retain the hanger 306 in the deployed position and prevent the hanger 306 from collapsing back toward the stowed position under the weight of accessories. Once so disposed in the locked position, the hanger 306 may receive and support an accessory or multiple accessories.

Figure 3C:
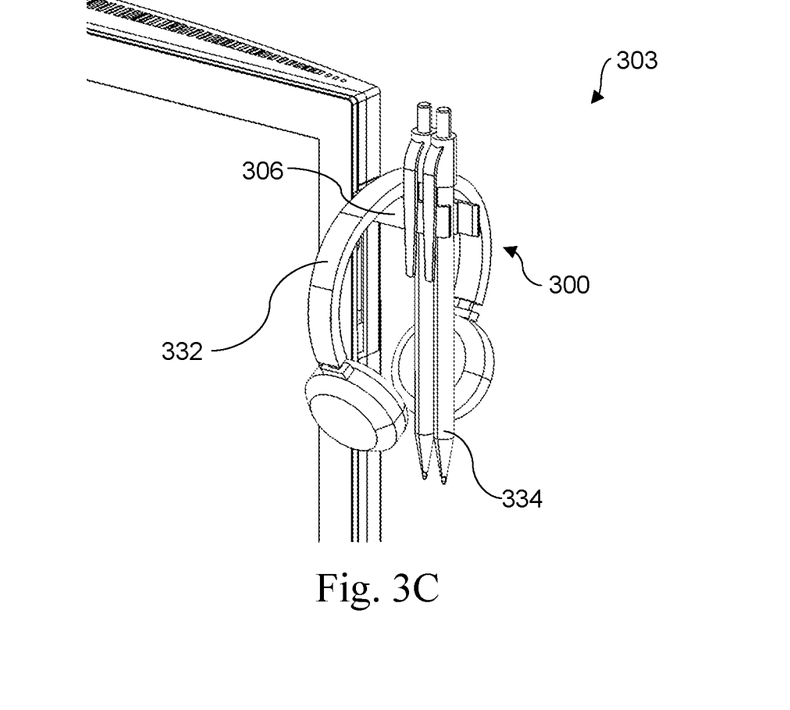

Referring now to FIG. 3C, another detail perspective view of the electronic device 303 and accessory hanger 300 is illustrated wherein the accessory hanger 300 is supporting and/or stowing a plurality of device accessories, e.g., first accessory 332 and second accessory 334. In some examples, first accessory 332 may be a headset and may be able to hang from the hanger 306 while the hanger 306 is in the deployed and locked positions. In further examples, second accessory 334 may be a utensil accessory and may have a thin, elongate structure, able to be passed through a thickness of the hanger 306, or a utensil slot therein, for stowage. In some examples, the utensil accessory may be a touch-input stylus or smart pen for use with a touch-screen display of the electronic device 303. In other examples, the utensil accessory may be a traditional writing implement such as a pen or pencil. In further examples, the utensil accessory may be another device or object having an elongate structure, such as a cable. In some examples, the hanger 306 may be able to accommodate multiple first accessories 332 and/or multiple second accessories 334, as illustrated.

What is claimed is:

1. An accessory hanger, comprising:
a pivot to rotatably engage with a housing of an electronic device about a pivot axis; and
a hanger rotatably attached to the pivot about a hanger axis, transverse to the pivot axis,
wherein the pivot is to rotate the hanger relative to the housing about the pivot axis between a stowed position and a deployed position, and wherein the hanger is movable from an unlocked position to a locked position when in the deployed position,
wherein the hanger is prevented from moving from the deployed position to the stowed position when in the locked position.

2. The accessory hanger of claim 1, wherein the hanger includes a lock tab, wherein upon the hanger being disposed in the deployed position and being rotated to the locked position, the lock tab is to prevent the hanger from being moved to the stowed position.

3. The accessory hanger of claim 1, wherein the hanger includes a utensil slot to receive a utensil when the hanger is in the locked position.

4. The housing of claim 1, wherein the pivot includes a t-slot to receive a flange post of the hanger such that the hanger is rotatable relative to the pivot about the hanger axis.

5. The accessory hanger of claim 1, wherein the pivot includes a stop notch to engage with the housing when the hanger is in the stowed position so as to stop the pivot from rotating about the pivot axis.

6. The accessory hanger of claim 1, wherein the pivot and the hanger each have an exterior surface that is flush with an exterior panel of the housing when the hanger is disposed in the stowed position.

7. The accessory hanger of claim 1, wherein the hanger includes an actuation tab extending from a distal end thereof, wherein the actuation tab is accessible by a user to transition the hanger between the stowed position and the deployed position.

8. A housing for an electronic device, comprising:
an exterior panel;
a hanger opening extending into the exterior panel; and
an accessory hanger disposed within the hanger opening, the accessory hanger comprising:
a hanger rotatably attached to a pivot, the pivot to move the hanger between a stowed position, disposed within the hanger opening, and a deployed position, extending from the hanger opening, about a pivot axis, wherein the hanger is rotatable from an unlocked position to a locked position relative to the pivot about a hanger axis, transverse to the pivot axis, when disposed in the deployed position so as to receive a device accessory, and wherein a lock tab extending from the hanger is to prevent the hanger from moving to the stowed position when disposed in the locked position.

9. The housing of claim 8, wherein the hanger opening includes a first portion extending a first distance into the exterior panel and a second portion, adjacent the first portion, extending a second distance, less than the first distance, into the exterior panel.

10. The housing of claim 9, wherein the first portion is to house the pivot and the second portion is to receive the hanger when the hanger is disposed in the stowed position.

11. The housing of claim 9, wherein the housing further includes a pivot post disposed within the first portion of the hanger opening, the pivot to rotate about the pivot post to transition the hanger between the stowed and the deployed position.

12. The housing of claim 8, wherein the pivot and the hanger each have an exterior surface that is flush with the exterior panel when the hanger is disposed in the stowed position.

13. The housing of claim 8, wherein the hanger includes an actuation tab extending from a distal end thereof and spaced apart from the exterior panel when the hanger is in the stowed position.

14. An electronic device, comprising:
a housing having an exterior panel;
a display disposed in the housing; and
an accessory hanger disposed within a hanger opening in the exterior panel, comprising:
a pivot rotatably engaged with the housing about a pivot axis; and
a hanger rotatably attached to the pivot about a hanger axis, transverse to the pivot axis,
wherein the pivot is to rotate the hanger relative to the housing between a stowed position within the housing and a deployed position extending from the exterior panel, and
wherein when in the deployed position, the hanger is movable about the hanger axis from an unlocked position to a locked position,
wherein the hanger is prevented from moving from the deployed position to the stowed position when in the locked position.

15. The electronic device of claim 14, wherein the hanger is to extend from the exterior panel in the deployed position so as to receive a device accessory.

16. The electronic device of claim 14, wherein the electronic device is an all-in-one (AIO) computing device.

17. The electronic device of claim 14, wherein the electronic device is a peripheral display for a computing device.

18. The electronic device of claim 14, wherein the hanger includes a utensil slot to receive a utensil when the hanger is in the locked position.

19. The electronic device of claim 14, wherein the hanger includes a lock tab, wherein upon the hanger being disposed in the deployed position and being rotated to the locked position, the lock tab is to prevent the hanger from being moved to the stowed position.

20. The electronic device of claim 14, wherein the hanger includes an actuation tab that is spaced apart from the exterior panel when the hanger is in the stowed position, wherein the actuation tab is accessible by a user to transition the hanger between the stowed position and the deployed position.

* * * * *